(12) United States Patent
Yamamori et al.

(10) Patent No.: US 8,575,232 B2
(45) Date of Patent: Nov. 5, 2013

(54) COATING COMPOSITION AND METHOD FOR PRODUCING THE SAME, COATING FILM AND UNDERWATER STRUCTURES

(75) Inventors: Naoki Yamamori, Neyagawa (JP); Hiroshi Tominaga, Neyagawa (JP); Mamoru Shimada, Neyagawa (JP)

(73) Assignees: Nippon Paint Co., Ltd., Osaka (JP); Nippon Paint Marine Coatings Co., Ltd., Hyogo (JP)

( * ) Notice: Subject to any disclaimer, the term of this patent is extended or adjusted under 35 U.S.C. 154(b) by 85 days.

(21) Appl. No.: 13/120,608

(22) PCT Filed: Sep. 28, 2009

(86) PCT No.: PCT/JP2009/066747
§ 371 (c)(1),
(2), (4) Date: Mar. 23, 2011

(87) PCT Pub. No.: WO2010/038692
PCT Pub. Date: Apr. 8, 2010

(65) Prior Publication Data
US 2011/0178204 A1 Jul. 21, 2011

(30) Foreign Application Priority Data
Sep. 30, 2008 (JP) .................................. 2008-253597

(51) Int. Cl.
*C09D 5/16* (2006.01)
*C09J 4/00* (2006.01)

(52) U.S. Cl.
USPC ............................. 523/122; 523/177; 523/205

(58) Field of Classification Search
USPC .......................................... 523/122, 177, 205
See application file for complete search history.

(56) References Cited

U.S. PATENT DOCUMENTS

| 4,774,080 A | 9/1988 | Yamamori et al. |
| 2007/0059273 A1 | 3/2007 | Price et al. |
| 2007/0272119 A1 | 11/2007 | Ichinose et al. |

FOREIGN PATENT DOCUMENTS

| CN | 1957049 | 5/2007 |
| CN | 101094899 | 12/2007 |
| EP | 1 749 868 A1 | 2/2007 |
| EP | 1 825 752 A2 | 8/2007 |
| GB | 2 435 602 A | 8/2007 |
| JP | 62-057464 | 3/1987 |
| JP | 2006-328244 | 12/2006 |
| JP | 2007-169449 | 7/2007 |
| JP | 2007-169628 | 7/2007 |
| WO | WO 2005/116155 | 12/2005 |

OTHER PUBLICATIONS

Supplementary European Search Report EP 09 81 7725 dated Jun. 11, 2012.
PCT International Search Report on application No. PCT/JP2009/066747 dated Dec. 15, 2009; 2 pages.
Office Action dated Dec. 17, 2012 issued in connection with Chinese Application No. 200980138221.2, with English translation.

*Primary Examiner* — Kriellion Sanders
(74) *Attorney, Agent, or Firm* — Foley & Lardner LLP

(57) ABSTRACT

Provided are coating composition containing an organic polymer particle (A) composed of an organic polymer having a hydroxyl group and a cationic group in a molecule, the weight average particle size of which being 10 to 35 μm, and a base resin (B), wherein the content of the organic polymer particle (A) is 0.5 to 5.0% by weight in the solid content of the coating composition, and a method of producing the same, and a coating film and underwater structure using the coating composition. The base resin (B) has a group represented by the following general formula (1):

$$\text{—COO-M-OCO-A} \quad (1)$$

(wherein, M represents a divalent or higher valent metal, and A represents an organic acid residue of monobasic acid) or a group represented by the following general formula (2):

$$\text{—COO—Si}(R^1R^2R^3) \quad (2)$$

(wherein, $R^1$, $R^2$ and $R^3$, which may be the same or different, represent an isopropyl group or an n-butyl group) in a side chain, or has a cross-linking structure represented by the following general formula (3):

$$\text{—COO-M-OCO—} \quad (3)$$

(wherein, M represents the same meaning as described above).

9 Claims, No Drawings

COATING COMPOSITION AND METHOD FOR PRODUCING THE SAME, COATING FILM AND UNDERWATER STRUCTURES

TECHNICAL FIELD

The present invention relates to a coating composition with improved low frictional performance, and a method of producing the same. Also, the present invention relates to a coating film formed from the coating composition, and an underwater structure having the coating film.

BACKGROUND ART

Marine vessels, fishnets, and other underwater structures are susceptible to adhesion of organisms such as barnacles, mussels, and algae. The adhesion of such organisms will inhibit efficient navigation of the marine vessels or the like, and lead a problem such as a waste of fuel. In fishnets or the like, the problems arise such that clogging occurs and useful life decreases. Conventionally, for preventing the adhesion of organisms to such underwater structures, an antifouling coating is applied on the surface of the underwater structures.

On the other hand, when a coating (coating film) is formed in the site where friction occurs with respect to a liquid, as in marine vessels or the like, it is desired to reduce the friction resistance between the vessel and liquid by a coating film, from the viewpoints of reducing fuel consumption in navigation of marine vessels, saving energy and the like.

As a coating composition capable of reducing such friction resistance, coating compositions containing a binder resin in which metal such as organotin, copper or zinc is introduced in the form of a salt into an acrylic resin side chain (also called a self-polishing type coating composition or hydrolyzable coating composition) are conventionally known (for example, Japanese Patent Laying-Open No. 62-57464 (Patent document 1)). A coating film formed from such a conventional self-polishing type coating composition (hydrolyzable coating composition) is gradually hydrolyzed by water such as sea water during navigation of the marine vessel, and as a result, roughness of the surface irregularities generated in formation of the coating film is reduced, and an effect of reducing friction resistance is exhibited. However, it cannot be said that the low frictional performance of the conventional self-polishing type coating composition is satisfactory, and a coating composition exhibiting better low friction resistance has been desired. For example, WO 05/116155 pamphlet (Patent document 2), Japanese Patent Laying-Open No. 2006-328244 (Patent document 3) and Japanese Patent Laying-Open No. 2007-169628 (Patent document 4) disclose coating compositions containing specific organic polymer particles or composite particles having a particle diameter of 0.05 to 100 μm as a coating composition for the purpose of further reducing friction resistance. However, also in these coating compositions, there is a room for improvement in low frictional performance.

PRIOR ART DOCUMENT

Patent Document

Patent Document 1: Japanese Patent Laying-Open No. 62-57464
Patent Document 2: WO 05/116155 pamphlet
Patent Document 3: Japanese Patent Laying-Open No. 2006-328244
Patent Document 4: Japanese Patent Laying-Open No. 2007-169628

SUMMARY OF THE INVENTION

Problems to be Solved by the Invention

The present invention has been made to solve the above problems, and it is an object of the present invention to provide a coating composition capable of obtaining excellent lower frictional performance compared with the conventional one, and a method of producing the same. It is another object of the present invention to provide a coating film exhibiting excellent low frictional performance formed by using such a coating composition, and an underwater structure such as marine vessel having the coating film.

Means for Solving the Problems

As a result of diligent research, the inventors of the present invention have found that a coating film formed from a coating composition containing organic polymer particles having a specific range of particle size, composed of an organic polymer having a hydroxyl group and a cationic group in the same molecule and a specific base resin serving as a binder resin exhibits very excellent low frictional performance, and have accomplished the present invention. That is, the present invention is as follows.

The present invention provides a coating composition including:

an organic polymer particle (A) composed of an organic polymer having a hydroxyl group and a cationic group in a molecule, the weight average particle size of which being 10 to 35 μm, and a base resin (B) having at least any one of a group represented by the following general formula (1):

$$-COO-M-OCO-A \qquad (1)$$

(wherein, M represents a divalent or higher valent metal, and A represents an organic acid residue of monobasic acid) and a group represented by the following general formula (2):

$$-COO-Si(R^1R^2R^3) \qquad (2)$$

(wherein, $R^1$, $R^2$ and $R^3$, which may be the same of different from one another, represent an isopropyl group or an n-butyl group) in a side chain, or having a cross-linking structure cross-linking between main chains, represented by the following general formula (3):

$$-COO-M-OCO- \qquad (3)$$

(wherein, M represents the same meaning as described above).

The content of the organic polymer particle (A) is 0.5 to 5.0% by weight in the solid content of the coating composition.

The cationic group contained in the organic polymer is preferably an amino group or an amide group.

Preferred examples of the organic polymer having an amino group or an amide group include chitin, chitosan and derivatives thereof.

The base resin (B) contained in the coating composition of the present invention preferably contains an acrylic resin having a group represented by the general formula (1) in a side chain.

The base resin (B) may contain a resin having at least any one of a group represented by the general formula (1) and a group represented by the general formula (2) in a side chain, and having a cross-linking structure represented by the general formula (3) that cross-links between main chains.

The present invention provides a method of producing a coating composition including the step of:

mixing an organic polymer particle (A) composed of an organic polymer having a hydroxyl group and a cationic group in a molecule, the weight average particle size of which being 10 to 35 μm, and a base resin (B) having at least any one of a group represented by the following general formula (1):

—COO-M-OCO-A    (1)

(wherein, M represents a divalent or higher valent metal, and A represents an organic acid residue of monobasic acid) and a group represented by the following general formula (2):

—COO—Si(R¹R²R³)    (2)

(wherein, R² and R³, which may be the same of different from one another, represent an isopropyl group or an n-butyl group) in a side chain, or having a cross-linking structure cross-linking between main chains, represented by the following general formula (3):

—COO-M-OCO—    (3)

(wherein, M represents the same meaning as described above) so that the content of the organic polymer particle (A) is 0.5 to 5.0% by weight in the solid content of the coating composition.

Further, the present invention provides a coating film formed from the coating composition and an underwater structure having the coating film. A preferred example of the underwater structure includes a marine vessel.

Effects of the Invention

According to the present invention, it is possible to provide a coating composition capable of obtaining very excellent low frictional performance compared with the conventional one and a coating film formed from the coating composition. By forming a coating film on the surface of an underwater structure such as a marine vessel using the coating composition of the present invention, it is possible to reduce the fuel consumption during navigation.

MODES FOR CARRYING OUT THE INVENTION

The coating composition of the present invention includes an organic polymer particle (A) composed of an organic polymer having a hydroxyl group and a cationic group in a molecule, the weight average particle size of which being 10 to 35 μm, and a base resin (B) having at least any one of a group represented by the following general formula (1):

—COO-M-OCO-A    (1)

(wherein, M represents a divalent or higher valent metal, and A represents an organic acid residue of monobasic acid) and a group represented by the following general formula (2):

—COO—Si(R¹R²R³)    (2)

(wherein, R¹, R² and R³, which may be the same or different from one another, represent an isopropyl group or an n-butyl group) in a side chain, or having a cross-linking structure cross-linking between main chains, represented by the following general formula (3):

—COO-M-OCO—    (3)

(wherein, M represents the same meaning as described above). According to the coating composition of the present invention, it is possible to form a coating film exhibiting excellent low frictional performance. In the following, the coating composition of the present invention will be described in detail.

[Organic Polymer Particles (A)]

The organic polymer particles (A) used in the present invention are composed of an organic polymer having both a hydroxyl group and a cationic group in a molecule. A coating film formed from a coating composition containing such an organic polymer particle (A) composed of an organic polymer has hydroxyl groups and cationic groups in its surface, so that it has high hydrophilicity, thereby exhibiting excellent low frictional performance. It is supposed that the excellent low frictional performance exhibited by the coating film formed from the coating composition of the present invention is partly attributable to the fact that substantial surface roughness of the surface of the coating film is reduced as a result of formation of a hydrogel layer on the surface of the coating film by hydroxyl groups arranged on the surface of the coating film and water in which the coating film is immersed.

In the coating film formed from the coating composition of the present invention, the organic polymer particle (A) is dispersed in the self-polishing type base resin (B) as will be described later, and when the base resin (B) elutes out, the organic polymer particle (A) exposed on the surface of the coating film will be released into water. It is supposed that the coating film formed from the coating composition of the present invention exhibits excellent low frictional performance for a long term partly because the effect of reducing surface roughness by the hydrogel layer can be retained for a long term since the release of the organic polymer particle (A) into water is delayed by interaction with a metal M possessed by the base resin (B) if the organic polymer particle (A) has a hydroxyl group and a cationic group.

While the coating composition of the present invention may be in any forms including an aqueous form, an NAD and a solvent system, it is necessary that the organic polymer particle (A) is not dissolved but dispersed in the coating composition.

In the present invention, as an organic polymer having both a hydroxyl group and a cationic group in a molecule, constituting the organic polymer particle (A), chitin, chitosan or derivatives thereof in which the cationic group is an amino group or an amide group is preferably used. Here, chitin (chemical name: poly-β1-4-N-acetylglucosamine) refers to a linear-chain nitrogen-containing polysaccharide having a hydroxyl group and an acetamide group represented by the molecular formula $(C_8H_{13}NO_5)_n$. Chitosan (chemical name: poly-β1-4-glucosamine) refers to a polysaccharide, which is a deacetylated substance of chitin, having a hydroxyl group and an amino group (sometimes also having an acetamide group).

In general, there is no clear borderline between "chitin" and "chitosan", however, those having a deacetylated ratio of less than 60% are called "chitin", and those having a deacetylated ratio of 60% or more are called "chitosan" in the present invention. In the present invention, as an organic polymer having both a hydroxyl group and a cationic group in a molecule, a mixture of chitin and chitosan may be used.

Examples of the derivatives of chitin or chitosan include those obtained by modifying or cross-linking chitin or chitosan with polyoxyethylene, an aldehyde group-containing compound, an organic acid compound or the like.

In the present invention, a synthetic resin particle may be used as the organic polymer particle (A). The synthetic resin particle can be produced by suspension polymerization of a radically polymerizable monomer composition in the presence of a hydrophilic polymer. Among others, a method of conducting suspension polymerization by adding a suspension of a radically polymerizable monomer composition (additive suspension) to an aqueous liquid of the hydrophilic polymer is preferably used. In this method, polymerization is achieved by adding the radically polymerizable monomer composition preliminarily emulsified or suspended to the aqueous liquid of the hydrophilic polymer under heating and stirring. By such a method, it is possible to obtain the synthetic resin particle having a weight average particle size of 10 to 35 µm.

The aqueous liquid of the hydrophilic polymer is preferably the hydrophilic polymer dissolved or dispersed in water. The hydrophilic polymer is not particularly restricted, and may be a naturally occurring polymer or a synthetic polymer. The hydrophilic polymer preferably has an appropriate quantity of hydrophilic functional groups, and a cross-linking chain as desired. Examples of the hydrophilic functional group include a hydroxyl group, an amino group, a carboxyl group, an amide group, a polyoxyethylene group and the like. Depending on the quantity of the hydrophilic functional groups possessed by the hydrophilic polymer, hydrophilicity may be too high and solubility in water may be too high. In such a case, hydrophilicity can be adjusted by introduction of a hydrophobic group or cross-linking.

Examples of the naturally occurring polymer include polysaccharides such as chitin, chitosan, gum arabic, alginic acid, carageenan, agar, xanthan gum, gellan gum, cellulose, xylose, starch, pullulan, pectin, roastbean gum, dextran and curdlan; proteins such as keratin, collagen, silk and γ-polyglutamic acid (hereinafter, represented by γ-PGA); and nucleic acid. Semi-synthetic polymers that are hydrophilized (for example, hydroalkylated), polyethyleneglycolated, hydrophobized (for example, alkylated) or three-dimensionalized by conducting hydrolysis, cross-linking reaction and the like on the above-mentioned naturally occurring polymers may be used as desired.

The naturally occurring polymers and semi-synthetic polymers preferably have a cationic group. Inclusion of a cationic group allows control of elution rate into seawater. The cationic group is not particularly restricted, and examples thereof include an amino group, an amide group, a pyridine group or the like.

The chitin and chitosan may be modified or cross-linked as desired by polyoxyethylene, an aldehyde group-containing compound, an organic acid compound or the like.

The synthetic polymer is not particularly restricted, and examples thereof include an acrylic resin, a polyester resin, an amine-based resin, a polyvinyl alcohol resin such as a modified polyvinyl alcohol resin and the like. The synthetic polymer is preferably a hydrophilic resin having a hydrophilic group such as hydroxyl group, amino group or carboxyl group. By adjusting hydrophilicity/hydrophobicity and the degree of cross-linking by a known method, a synthetic polymer having appropriate hydrophilicity can be obtained.

Among the above hydrophilic polymers, at least one hydrophilic resin selected from starch, Arabic glue, x-carrageenan, gelatin, cellulose, chitin, chitosan and modified substances thereof, polyvinyl alcohol, polyallylamine, polyvinylamine, poly(meth)acrylamide, poly(meth)acrylic acid and copolymers thereof is preferred. In particular, chitin, chitosan and polyvinyl alcohol are more preferred.

The aqueous liquid of a hydrophilic polymer may be an acidic liquid in which an acidic monomer such as acrylic acid is dissolved. The hydrophilic polymer is more likely to be taken into the polymer composed of the radically polymerizable monomer composition when it is supplied to the reaction system as an acidic liquid.

The suspension of a radically polymerizable monomer composition (additive suspension) is preferably composed of a hydrophilic polymer, a radically polymerizable monomer composition, a polymerization initiator and water.

By using the additive suspension composed of the above composition, a desirable complex state of the hydrophilic polymer and a polymer obtained by radical polymerization is realized, and resin particles retaining an intended particle size can be obtained. In particular, it is also preferred to add the hydrophilic polymer to the additive suspension.

Examples of the hydrophilic polymer contained in the suspension of a radically polymerizable monomer composition include the hydrophilic polymers mentioned above. The hydrophilic polymer contained in the aqueous liquid of a hydrophilic polymer and the hydrophilic polymer contained in the suspension of a radically polymerizable monomer composition are preferably of the same type.

As the radically polymerizable monomer composition, a monomer composition containing a hydroxyl group-containing radically polymerizable monomer and a cationic group-containing radically polymerizable monomer is preferably used. Examples of the hydroxyl group-containing radically polymerizable monomer include, but are not restricted to, n-butyl α(hydroxymethyl) (meth)acrylate, 4-hydroxybutyl (meth)acrylate, 2-hydroxyethyl (meth)acrylate, 2-hydroxypropyl (meth)acrylate, 2-hydroxybutyl (meth)acrylate, 2-hydroxy-3-phenoxypropyl (meth)acrylate, polyethylene glycol mono(meth)acrylate, dipropylene glycol monoacrylate, polypropylene glycol monoacrylate, ε-caprolactone modified substances of these hydroxyl group-containing radically polymerizable monomers, and the like.

Examples of the cationic group-containing radically polymerizable monomer include, but are not restricted to, N,N-dimethylaminoethyl (meth)acrylate, N,N-dimethylaminopropyl (meth)acrylamide, pentamethylpiperidyl (meth)acrylate, tetramethylpiperidyl (meth)acrylate, 2-t-butylaminoethyl (meth)acrylate, allylamine, 4-vinylpyridine, 2-vinylpyridine, and the like.

The contents of the hydroxyl group-containing radically polymerizable monomer and the cationic group-containing radically polymerizable monomer in the radically polymerizable monomer composition are not particularly restricted, and may be appropriately adjusted depending on the hydrophilicity of the resulting synthetic resin particles, the desired low frictional performance and the like. The radically polymerizable monomer composition may contain other radically polymerizable monomers besides the hydroxyl group-containing radically polymerizable monomer and the cationic group-containing radically polymerizable monomer.

The weight average particle size of the organic polymer particle (A) used in the present invention has a lower limit of 10 µm and an upper limit of 35 µm. By blending organic polymer particle (A) having a weight average particle size in this range, it is possible to impart very excellent low frictional performance to a coating film, and to keep the low frictional performance for a long term. Although the low frictional performance can be improved, compared with a coating composition not containing the organic polymer particle (A), even when organic polymer particle (A) has a weight average particle size of less than 10 µm or more than 35 µm and is composed of an organic polymer having a hydroxyl group and a cationic group in a molecule, the low frictional performance can be improved particularly dramatically by using the organic polymer particle (A) having a weight average particle size of 10 to 35 μm.

The reason why the low frictional performance is dramatically improved by using the organic polymer particle (A) having a weight average particle size of 10 to 35 μm can include the following points.

(i) By using the organic polymer particle (A) having a weight average particle size of 10 μm or more, the aforementioned hydrogel layer is likely to be formed over the entire surface of the coating film, so that excellent low frictional performance is imparted.

(ii) By using the organic polymer particle having a weight average particle size of more than 35 μm, surface roughness increases due to roughness of the organic polymer particle compared with a case where the organic polymer particle (A) of 35 μm or less are used, so that the low frictional performance is inhibited.

In the present invention, "weight average particle size" of the organic polymer particle (A) to be blended in the coating composition means a weight average particle size measured by laser diffraction method, and more concretely, means a value measured by using "laser diffraction-type particle size distribution measuring apparatus SALD-2200" manufactured by SHIMADZU Corporation. As a dispersion medium for a particle size measurement, ethanol is used, and a measuring temperature is set at 25° C. The "weight average particle size" of the organic polymer particle (A) which has been contained in the coating composition is measured by using a scanning electron microscope (SEM).

Particles of chitin, chitosan or derivatives thereof having a weight average particle size of 10 to 35 μm are commercially obtainable. Such a commercial product of chitin, chitosan or derivatives thereof may be ground and classified as desired before use.

The content of the organic polymer particle (A) falls within the range between a lower limit of 0.5% by weight and an upper limit of 5.0% by weight in the total solid content in the coating composition (hereinafter, referred to as the solid content of the coating composition). Although the low frictional performance can be sufficiently improved, compared with a coating composition not containing the organic polymer particle (A), even when the organic polymer particle (A) is used in a content of less than 0.5% by weight or more than 5.0% by weight, excellent low frictional performance can be realized for a longer term by setting the content at 0.5 to 5.0% by weight in the solid content of the coating composition. Also by setting the content of the organic polymer particle (A) at 5.0% by weight or less in the solid content of the coating composition, it is possible to form a coating film without adversely affecting on the physical property (such as adherence with a substrate) of the resulting coating film, and releasability of an antifouling agent (C) into water when the coating composition of the present invention contains the antifouling agent (C) and is used as an antifouling coating composition. Here, the total solid content in the coating composition (the solid content of the coating composition) means a residue obtained by drying the coating composition at 105° C. for an hour.

The reason why excellent low frictional performance can be obtained for a longer term by setting the content of the organic polymer particle (A) at 0.5 to 5.0% by weight in the solid content of the coating composition can include the following points.

(i) By setting the content of the organic polymer particle (A) at 0.5% by weight or more, the hydrogel layer is more likely to be formed over the entire surface of the coating film, so that excellent low frictional performance can be realized for a longer term.

(ii) By controlling the content of the organic polymer particle (A) to 5.0% by weight or less, an influence of the increase of roughness due to rough particles contained the organic polymer particles is suppressed, compared with a case where 5.0% by weight or more of the organic polymer particle (A) is used, so that excellent low frictional performance can be realized for a longer term.

[Base Resin (B)]

The coating composition of the present invention contains a base resin (B) as a binder resin. The base resin (B) contained in the coating composition of the present invention includes a resin having at least any one of a group represented by the following general formula (1):

—COO-M-OCO-A  (1)

(wherein, M represents a divalent or higher valent metal, and A represents an organic acid residue of monobasic acid) and a group represented by the following general formula (2):

—COO—Si(R¹R²R³)  (2)

(wherein, $R^1$, $R^2$ and $R^3$, which may be the same or different from one another, represent an isopropyl group or an n-butyl group) in a side chain, or having a cross-linking structure cross-linking between main chains, represented by the following general formula (3):

—COO-M-OCO—  (3)

(wherein, M represents the same meaning as described above). Among these, an acrylic resin having the group represented by the general formula (1) and/or general formula (2) in a side chain, or an acrylic resin having a cross-linking structure represented by the general formula (3) that cross-links between polymer main chains is preferably used because stable low friction effect can be kept for a long term.

The base resin (B) having the side chain and/or the cross-linking structure as described above is called a self-polishing type polymer, and has a function of preventing adhesion of aquatic organisms such as barnacles since the resin gradually dissolves due to hydrolysis in water when it is used as a binder component for forming a coating film in the coating composition. When a certain amount of the base resin (B) dissolves in water owing to such self-polishing function, the organic polymer particle (A) exposed on the surface of the coating film is released into water, and a new organic polymer particle (A) is made to be exposed on the surface, so that excellent low frictional performance by the organic polymer particle (A) can be sustained. Further, by interaction between the hydroxyl group and cationic group possessed by the organic polymer particle (A), and the metal M and/or Si possessed by the base resin (B), release of the organic polymer particle (A) into water is delayed compared with a case where only a binder resin not having the metal M and Si is used, so that the low frictional performance by the organic polymer particle (A) can be sustained for a long term. Also since a metal ion is released due to the hydrolysis of the base resin (B), the coating film formed from the coating composition of the present invention exhibits excellent antifouling performance. Therefore, the coating composition of the present invention is suitably used as an antifouling coating composition exhibiting excellent low frictional performance.

Examples of the base resin (B) used in the present invention include the following resins:

(I) an acrylic resin having the group represented by the general formula (1) in a side chain (hereinafter, referred to as acrylic resin (I));

(II) an acrylic resin having the group represented by the general formula (1) and the group represented by the general formula (2) in side chains (hereinafter, referred to as acrylic resin (II));

(III) an acrylic resin having the group represented by the general formula (2) in a side chain (hereinafter, referred to as acrylic resin (III)); and (IV) an acrylic resin having a cross-linking structure represented by the general formula (3) cross-linking between polymer main chains (hereinafter, referred to as acrylic resin (IV)).

<Acrylic Resin (I)>

The acrylic resin (I) is an acrylic resin having at least one group represented by the general formula (1) in an acrylic resin side chain. The acrylic resin (I) may be produced, for example, by the following method (a) or (b).

(a) a method of allowing a resin obtained by copolymerization of a polymerizable unsaturated organic acid and another copolymerizable unsaturated monomer to react with a metal compound and a monobasic acid, or transesterifying the resin with a metal ester of a monobasic acid, (b) a method of copolymerizing a metal-containing polymerizable unsaturated monomer and another copolymerizable unsaturated monomer.

In the method (a), the method of allowing a resin obtained by copolymerization of a polymerizable unsaturated organic acid and another copolymerizable unsaturated monomer to react with a metal compound and a monobasic acid, or transesterifying the resin with a metal ester of a monobasic acid may be conducted by a conventionally known method, and it is desired that heating, stirring and the like are conducted at a temperature equal to or lower than the decomposition temperature of the metal ester.

The polymerizable unsaturated organic acid used in the above method (a) is not particularly restricted, and for example, those having one or more carboxyl groups are recited, and examples thereof include an unsaturated monobasic acid such as (meth)acrylic acid; an unsaturated dibasic acid and its monoalkyl ester such as maleic acid and its monoalkyl ester, or itaconic acid and its monoalkyl ester; a dibasic acid adduct of a hydroxylalkyl ester of an unsaturated monobasic acid such as a maleic acid adduct of 2-hydroxyethyl (meth)acrylate, a phthalic acid adduct of 2-hydroxyethyl (meth)acrylate, and a succinic acid adduct of 2-hydroxyethyl (meth)acrylate. These polymerizable unsaturated organic acids may be used singly or in combination of two or more kinds.

The metal-containing polymerizable unsaturated monomer used in the above method (b) is a polymerizable unsaturated monomer having a group represented by the general formula (1). The metal-containing polymerizable unsaturated monomer may be obtained by allowing a polymerizable unsaturated organic acid as used in the method (a) to react with a metal compound and a monobasic acid in a manner similar to the method (a) or transesterifying the polymerizable unsaturated organic acid with a metal ester of a monobasic acid.

The other copolymerizable unsaturated monomer used in the methods (a) and (b) is not particularly restricted, and examples thereof include alkyl (meth)acrylate esters having 1 to 20 carbon(s) in the ester moiety such as methyl (meth)acrylate, ethyl (meth)acrylate, i-propyl (meth)acrylate, n-butyl (meth)acrylate, i-butyl (meth)acrylate, t-butyl (meth)acrylate, 2-ethylhexyl (meth)acrylate, lauryl (meth)acrylate and stearyl (meth)acrylate; hydroxyl group-containing alkyl (meth)acrylate esters having 1 to 20 carbon(s) in the ester moiety such as 2-hydroxypropyl (meth)acrylate and 2-hydroxyethyl (meth)acrylate; cyclic hydrocarbon (meth)acrylate esters such as phenyl (meth)acrylate and cyclohexyl (meth)acrylate; polyalkylene glycol (meth)acrylate esters such as ethylene glycol mono(meth)acrylate and polyethylene glycol mono(meth)acrylate having a polymerization degree of 2 to 30; and (meth)acrylate esters such as C1-C3 alkoxyalkyl (meth)acrylate including methoxyethyl (meth)acrylate. Concrete examples other than the (meth)acrylate esters include (meth)acrylamide; vinyl compounds such as styrene, α-methylstyrene, vinyl acetate, vinyl propionate, vinyl benzoate, vinyl toluene and acrylonitrile; crotonate esters; and unsaturated dibasic acid diesters such as maleate diesters and itaconate diesters. The ester moiety of the (meth)acrylate esters is preferably C1 to C8 alkyl groups, and C1 to C6 alkyl groups are more preferred. Concrete examples of the (meth)acrylate esters used preferably include methyl (meth)acrylate, ethyl (meth)acrylate, butyl (meth)acrylate, and cyclohexyl (meth)acrylate. The other copolymerizable unsaturated monomers may be used singly or in combination of two or more kinds.

The metal compound is not particularly restricted, and examples thereof include metal oxides, metal hydroxides, metal chlorides, metal sulfides, metal salts of organic acids, basic metal carbonates and the like. These may be used singly or in combination of two or more kinds. The metal compound is a supply source of the metal M possessed by the base resin (B). The metal contained in the metal compound (that is, the metal M possessed by the base resin (B)) is a divalent or higher valent metal, and is preferably copper (II) and/or zinc (II).

The monobasic acid is not particularly restricted, and for example, examples thereof include monobasic acids having 2 to 30 carbons, and among these, a monobasic cyclic organic acid or the like is preferred. The monobasic acid forms "—OCO-A" (A represents an organic acid residue of a monobasic acid) moiety in the group represented by the general formula (1).

The monobasic cyclic organic acid is not particularly restricted, and examples thereof include those having a cycloalkyl group such as naphthenic acid, and resin acids such as tricyclic resin acid and salts thereof.

The tricyclic resin acid is not particularly restricted, and examples thereof include a monobasic acid having a diterpenic hydrocarbon skeleton and the like. Examples of the monobasic acid having a diterpenic hydrocarbon skeleton include compounds having abietane, pimarane, isopimarane, or labdane skeleton, and more concrete examples include abietic acid, neoabietic acid, dehydroabietic acid, hydrogenated abietic acid, palustric acid, pimaric acid, isopimaric acid, levopimaric acid, dextropimaric acid, sandaracopimaric acid and the like. Among these, abietic acid, dehydroabietic acid, hydrogenated abietic acid and salts thereof are preferred because of excellent long-term sustention of low friction resistance and long-term antifouling performance owing to appropriate hydrolysis, and because of excellent anti-cracking performance of a coating film and ease of availability.

The monobasic cyclic organic acid is not necessarily highly purified, and rosin, pine resin acid and the like may be used. As such, for example, rosins, hydrogenated rosins, and disproportionated rosins are recited. The rosins used herein refer to gum rosin, wood rosin, tall oil rosin and the like. The rosins, hydrogenated rosins and disproportionated rosins are preferred in that they easily available at low costs, and excellent in handling, and exert long-term sustention of low frictional performance and long-term antifouling performance.

These monobasic cyclic organic acids may be used singly or in combination of two or more kinds.

Among the monobasic acids that may be used in the present invention, examples of the monobasic acids other than the above monobasic cyclic organic acids include monobasic acids having about 1 to 30 carbon(s) such as acetic acid, (meth)acrylic acid, propionic acid, butyric acid, lauryl acid, palmitic acid, 2-ethylhexanoic acid, stearic acid, linoleic acid, oleic acid, chloroacetic acid, fluoroacetic acid, valeric acid, versatic acid, 12-hydroxystearic acid and hydrogenated castor oil fatty acid. Monobasic acids having 5 to 20 carbons are preferred. These monobasic acids other than the monobasic cyclic organic acids may be used singly or in combination of two or more kinds. As the monobasic acid, a monobasic cyclic organic acid and a monobasic acid other than the monobasic cyclic organic acid may be used together.

When a monobasic cyclic organic acid and a monobasic acid other than the monobasic cyclic organic acid are used together as the monobasic acid, the monobasic cyclic organic acid preferably occupies between a lower limit of 5 mol % and an upper limit of 100 mol % among the monobasic acids used. That is, in the organic acid residue of the monobasic acid in the general formula (1), the monobasic cyclic organic acid preferably occupies between a lower limit of 5 mol % and an upper limit of 100 mol %. The content of the monobasic cyclic organic acid is more preferably between a lower limit of 15 mol % and an upper limit of 100 mol %, and further preferably between a lower limit of 25 mol % and an upper limit of 100 mol %. By setting the content of the organic acid residue derived from the monobasic cyclic organic acid at 5 mol % or more, hydrolysis of the base resin (B) is appropriately conducted, so that more excellent long-term sustention of low frictional performance and long-term antifouling performance are realized, and the anti-cracking performance of the coating film can be further improved.

The acid value of the monobasic cyclic organic acid used for introducing the monobasic cyclic organic acid residue is preferably between a lower limit of 70 mg KOH/g and an upper limit of 300 mg KOH/g, and more preferably between a lower limit of 120 mg KOH/g and an upper limit of 250 mg KOH/g. Within this range, hydrolysis of the base resin (B) is appropriately conducted, so that a coating film having more excellent long-term sustention of low frictional performance and long-term antifouling performance can be formed. The acid value of the monobasic cyclic organic acid is more preferably between a lower limit of 120 mg KOH/g and an upper limit of 220 mg KOH/g.

In the method (a), a number average molecular weight of the resin obtained by copolymerization of a polymerizable unsaturated organic acid and another copolymerizable unsaturated monomer preferably falls within a range between a lower limit of 2000 and an upper limit of 100000, and more preferably within a range between a lower limit of 3000 and an upper limit of 40000 in terms of standard polystyrene using gel permeation chromatography (GPC). When it is less than 2000, the film formability of the coating film can be deteriorated, whereas when it is more than 100000, the storage stability of the resulting coating composition is impaired and the coating composition is not suitable for practical use, and use of a large amount of diluting solvents is required at the time of coating, which is not desired in terms of public hygiene and economics.

In the method (a), the resin obtained by copolymerization of a polymerizable unsaturated organic acid and another copolymerizable unsaturated monomer preferably has an acidic value of 70 to 300 mg KOH/g. When it is less than 70 mg KOH/g, the amount of a metal salt to be bound to the side chain is small, and appropriate hydrolytic property of the base resin (B) tends not to be obtained, whereas when the acidic value is more than 300 mg KOH/g, the long-term sustention of low frictional performance and long-term antifouling performance tend not to be obtained satisfactorily owing to too high elution rate of the resulting coating film.

The acrylic resin (I) obtained in the manner as described above has at least one group represented by the general formula (1) as a side chain. In the general formula (1), metal M is a divalent or higher valent metal, and preferably copper (II) or zinc (II).

The metal M is preferably contained in a range between a lower limit of 0.05% by weight and an upper limit of 20% by weight in the solid content of the acrylic resin (I). When it is less than 0.05% by weight, the antifouling performance of the coating film tends to decrease because elution of the entire resin is very slow even if part of the metal salt in the resulting coating film is hydrolyzed. When it is more than 20% by weight, the long-term sustention of low frictional performance and long-term antifouling performance tend not to be obtained satisfactorily because the elution rate of the resulting coating film is too high. The content of the metal M preferably falls within a range between a lower limit of 0.5% by weight and an upper limit of 15% by weight.

In the acrylic resin (I), the group represented by the general formula (1) is preferably contained within a range between a lower limit of 0.001 mol/g and an upper limit of 0.006 mol/g in the solid content of the acrylic resin (I). By adjusting the content of the group represented by the general formula (1) within this range, the elution rate of the acrylic resin (I) that is the base resin (B) into water becomes appropriate, and a coating film having the long-term sustention of low frictional performance and long-term antifouling performance is readily obtained.

<Acrylic Resin (II)>

The acrylic resin (II) is an acrylic resin having at least one group represented by the general formula (1) and at least one group represented by the general formula (2), respectively, in acrylic resin side chains.

In the general formula (2), $R^1$, $R^2$ and $R^3$, which are the same or different from one another, represent an isopropyl group or an n-butyl group. Preferably, all of $R^1$, $R^2$ and $R^3$ are an isopropyl group. As a result of this, a coating film exhibiting long-term sustention of low frictional performance and long-term antifouling performance is more easily obtained. Also, the storage stability of the resulting coating composition can be improved.

Preferably, the acrylic resin (II) is obtained from a monomer mixture containing triorganosilyl (meth)acrylate represented by the following general formula (4). As a result of this, a coating film exhibiting long-term sustention of low frictional performance and long-term antifouling performance is more easily obtained.

(chemical formula 1)

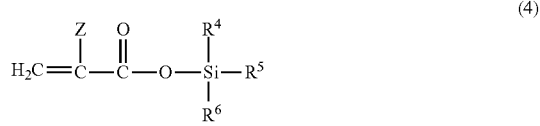

(4)

In the triorganosilyl (meth)acrylate represented by the general formula (4), Z represents a hydrogen atom or a methyl group. $R^4$, $R^5$ and $R^6$, which are the same or different from one another, represent an isopropyl group or an n-butyl group, and preferably all of these are an isopropyl group. As a result of this, a coating film exhibiting long-term sustention of low frictional performance and long-term antifouling performance is more easily obtained. Also, the storage stability of the resulting coating composition can be improved.

Concrete examples of the triorganosilyl (meth)acrylate represented by the general formula (4) include tri-i-propylsilyl (meth)acrylate, and tri-n-butylsilyl (meth)acrylate.

As the triorganosilyl (meth)acrylate represented by the general formula (4), tri-i-propylsilyl (meth)acrylate is preferred because stable polishing rate is maintained for a long term. The triorganosilyl (meth)acrylate may be used singly or in combination of two or more kinds.

The acrylic resin (II) may be produced by the following method (c) or (d).

(c) a method including a first step of polymerizing a polymerizable unsaturated organic acid, the triorganosilyl (meth) acrylate represented by the general formula (4), and another copolymerizable unsaturated monomer, and a second step of allowing a resin obtained in the first step to react with a metal compound and a monobasic acid, or transesterifying the resin with a metal ester of a monobasic acid, (d) a method of copolymerizing a metal-containing polymerizable unsaturated monomer, the triorganosilyl (meth)acrylate represented by the general formula (4), and another copolymerizable unsaturated monomer.

The first step of the method (c) is a step of polymerizing a polymerizable unsaturated organic acid (for example, 3 to 50% by weight), the triorganosilyl (meth)acrylate represented by the general formula (4) (for example, 90 to 5% by weight), and another copolymerizable unsaturated monomer. A method of polymerizing these monomer components is not particularly restricted, and examples thereof include methods that include mixing a monomer mixture composed of a polymerizable unsaturated organic acid, the triorganosilyl (meth) acrylate and another copolymerizable unsaturated monomer, with a polymerization initiator such as an azo compound or peroxide to prepare a mixed solution, and adding the solution dropwise into a solvent such as xylene or n-butanol, and allowing to react under heating. Examples of the polymerizable unsaturated organic acid and the other copolymerizable unsaturated monomer include those described in connection with the above acrylic resin (I).

A number average molecular weight of the resin obtained by the first step of the method (c) preferably falls within a range between a lower limit of 2000 and an upper limit of 100000, and more preferably within a range between a lower limit of 3000 and an upper limit of 40000 in terms of standard polystyrene using gel permeation chromatography (GPC). When it is less than 2000, the film formability of the coating film can be deteriorated, whereas when it is more than 100000, the storage stability of the resulting coating composition is impaired and the coating composition is not suitable for practical use, and use of a large amount of diluting solvents is required at the time of coating, which is not desired from the view points of public hygiene and economics.

The resin obtained by the first step of the method (c) preferably has an acidic value of 30 to 300 mg KOH/g. When it is less than 30 mg KOH/g, the amount of a metal salt to be bound to the side chain is small, and appropriate hydrolytic property of the base resin (B) tends not to be obtained, whereas when the acidic value is more than 300 mg KOH/g, the long-term sustention of low frictional performance and long-term antifouling performance tend not to be obtained satisfactorily owing to too high elution rate of the resulting coating film.

The second step of the method (c) is a step of allowing the resin obtained in the first step to react with a metal compound and a monobasic acid, or transesterifying the resin with a metal ester of a monobasic acid. That is, by this second step, the group represented by the general formula (1) is formed in a side chain of the resin.

In the second step of the method (c), a method of allowing the resin obtained in the first step to react with a metal compound and a monobasic acid, or transesterifying the resin with a metal ester of a monobasic acid may be achieved by a conventionally known method, and it is desired that heating, stirring and the like are conducted at a temperature lower than the decomposition temperature of the metal ester.

The metal-containing polymerizable unsaturated monomer used in the method (d) may be those described in connection with the acrylic resin (I). Copolymerization in the method (d) may be conducted in a manner similar to the method (c).

In the acrylic resin (II), the group represented by the general formula (1) is preferably contained in an amount ranging from a lower limit of 0.001 mol/g to an upper limit of 0.006 mol/g in the solid content of the acrylic resin (II). The group represented by the general formula (2) is preferably contained in an amount ranging from a lower limit of 0.0004 mol/g to an upper limit of 0.004 mol/g in the solid content of the acrylic resin (II). By adjusting the contents of these groups within these ranges, the elution rate of the acrylic resin (II) that is the base resin (B) into water becomes appropriate, and a coating film having long-term sustention of low frictional performance and long-term antifouling performance is more easily obtained.

<Acrylic Resin (III)>

The acrylic resin (III) is an acrylic resin having at least one group represented by the general formula (2) in a side chain of the acrylic resin and is a self-polishing polymer likewise the acrylic resins (I) and (II) mentioned above.

Examples of the acrylic resin (III) include those obtained by a method of allowing a polymerizable unsaturated monomer and a monomer having a triorganosilyl group to react with each other, and among these, those obtained by polymerization of the triorganosilyl (meth)acrylate represented by the general formula (4) with another copolymerizable unsaturated monomer are preferred. The other copolymerizable unsaturated monomer mentioned above is not particularly restricted, and examples thereof include those described in connection with the acrylic resin (I) and the polymerizable unsaturated organic acids described in connection with the acrylic resin (I). Each of the polymerizable unsaturated organic acid and other copolymerizable unsaturated monomer may be used singly or in combination of two or more kinds.

In the triorganosilyl (meth)acrylate represented by the general formula (4), Z represents a hydrogen atom or a methyl group. $R^4$, $R^5$ and $R^6$, which may be the same or different from one another, represent an isopropyl group or an n-butyl group, and preferably all of these are a propyl group. As a result of this, a coating film exhibiting long-term sustention of low frictional performance and long-term antifouling performance is more easily obtained. Also, the storage stability of the resulting coating composition can be improved.

Concrete examples of the triorganosilyl (meth)acrylate represented by the general formula (4) include tri-i-propylsilyl (meth)acrylate, and tri-n-butylsilyl (meth)acrylate.

As the triorganosilyl (meth)acrylate represented by the general formula (4), tri-i-propylsilyl (meth)acrylate is preferred because stable polishing rate is kept for a long term. The triorganosilyl (meth)acrylate may be used singly or in combination of two or more kinds.

The triorganosilyl (meth)acrylate represented by the general formula (4) is preferably contained in an amount ranging from an upper limit of 90% by weight to a lower limit of 5% by weight in 100% by weight of the monomer mixture used for polymerization. When it is more than 90% by weight, peeling can be generated in a coated film, whereas when it is less than 5% by weight, the proportion of a triorganosilyl group in the resulting resin is small, so that a coating film exhibiting long-term sustention of low frictional performance and long-term antifouling performance tends to be difficult to be obtained. The content of the triorganosilyl (meth)acrylate represented by the general formula (4) in the monomer mixture is more preferably in a range between an upper limit of 70% by weight and a lower limit of 10% by weight.

A method of polymerizing the monomer mixture is not particularly restricted, and examples thereof include methods that include mixing a monomer mixture composed of the triorganosilyl (meth)acrylate and another copolymerizable unsaturated monomer, with a polymerization initiator such as an azo compound or peroxide to prepare a mixed solution, and adding the solution dropwise into a solvent such as xylene or n-butanol, and allowing to react under heating.

A number average molecular weight of the acrylic resin (III) preferably falls within a range between a lower limit of 2000 and an upper limit of 100000, and more preferably within a range between a lower limit of 3000 and an upper limit of 40000 in terms of standard polystyrene using gel permeation chromatography (GPC). When it is less than 2000, the film formability of the coating film can be deteriorated, whereas when it is more than 100000, not only the storage stability of the resulting coating composition is impaired and the coating composition is not suitable for practical use, but also use of a large amount of diluting solvents is required at the time of coating, which is not desired from the view points of public hygiene and economics.

In the acrylic resin (III), the group represented by the general formula (2) is preferably contained in an amount ranging from a lower limit of 0.0004 mol/g to an upper limit of 0.004 mol/g in the solid content of the acrylic resin (III). By adjusting the content of the group represented by the general formula (2) within this range, the elution rate of the acrylic resin (III) that is the base resin (B) into water becomes appropriate, and a coating film having long-term sustention of low frictional performance and long-term antifouling performance is more likely to be obtained.

The group represented by the general formula (2) is preferably contained in an amount ranging from a lower limit of 10% by weight to an upper limit of 90% by weight in the solid content of the acrylic resin (III). When it is less than 10% by weight, self-polishing property may be insufficient, whereas when it is more than 90% by weight, the elution of the coating film may be too fast to retain the coating film for a long term. More preferably, the content thereof falls within a range between a lower limit of 30% by weight and an upper limit of 80% by weight.

<Acrylic Resin (IV)>

The acrylic resin (IV) is an acrylic resin having at least one cross-linking structure represented by the general formula (3) that cross-links between polymer main chains. In the general formula (3), M represents a divalent or higher valent metal, and preferably a divalent metal such as Mg, Zn, and Ca.

Examples of a method of producing an acrylic resin having a cross-linking structure containing a divalent metal include a method of allowing a divalent metal compound to react with (add to) a carboxyl group containing acrylic resin, and a method of polymerizing a monomer composition including a polymerizable monomer containing a divalent metal by solution polymerization or the like. A method of solution polymerization is not particularly restricted, and a known method may be used.

Examples of the polymerizable monomer containing a divalent metal include a metal-containing polymerizable monomer having two unsaturated groups represented by the following general formula (5):

$$[(CH_2\!=\!CHCOO)_2M] \qquad (5)$$

(wherein M represents a divalent metal such as Mg, Zn and Ca) and the following general formula (6):

$$[(CH_2\!=\!C(CH_3)COO)_2M] \qquad (6)$$

(wherein M represents a divalent metal such as Mg, Zn and Ca).

The acrylic resin (IV) may have the group represented by the general formula (1) and/or the general formula (2) in a side chain. For obtaining an acrylic resin (IV) having such a group in a side chain, the monomers recited in connection with the acrylic resins (I) to (III) may be used as a part of monomer components for preparing the acrylic resin (IV).

The metal amount of the acrylic resin (IV) in the solid content of the resin is preferably 0.05 to 20% by weight. The metal amount of the acrylic resin (IV) means the total amount of the metal in the cross-linking structure and the metal in the group represented by the general formula (1).

Each of the acrylic resins (I) to (IV) may be used singly or in combination of two or more kinds as the base resin (B).

[Other Binder Resin]

The coating composition of the present invention may contain another binder resin as well as the base resin (B) for adjusting the physical property of a coating film and the attrition rate of a coating film. Examples of the other binder resin include, but are not particularly restricted to, a chlorinated rubber, polyvinyl acetate, an alkyd resin, a polyester resin, polyvinyl chloride and the like. As the other binder resin, an acrylic resin other than the acrylic resins (I) to (IV) mentioned above may be used. Examples of the acrylic resin other than the acrylic resins (I) to (IV) include a poly(meth) acrylic acid alkyl ester and the like. Also, the coating composition of the present invention may contain additives such as silicon oil; wax; vaseline; liquid paraffin; rosin; hydrogenated rosin; naphthenic acid; fatty acid; divalent metal salts of rosin, hydrogenated rosin, naphthenic acid or fatty acid; chlorinated paraffin; polyvinylalkyl ether; polypropylene sebacate; partially hydrogenated terphenyl; and polyether polyol as needed. The other binder resin and additive may be respectively used singly or in combination of two or more kinds.

When the coating composition of the present invention contains the other binder resin as well as the base resin (B), a weight ratio between the solid content of the base resin (B) and the solid content of the other binder resin, [base resin (B)]:[other binder resin] is preferably 100:0 to 50:50. By setting the proportion of the other resin binder within the above range, a coating film that is excellent in long-term sustention of low frictional performance and long-term antifouling performance and anti-cracking performance is more easily obtained.

The coating composition of the present invention may be in any forms such as a solvent-based coating composition, an NAD type coating composition, and an aqueous coating composition. In the case of a solvent-based coating composition, the base resin (B) (and other binder resin added as desired) may be used as it is in the form of a resin solution obtained by making reaction in an organic solvent. In the case of an aqueous coating composition, as the base resin (B) (and other binder resin added as desired) mentioned above, for example, a dispersion prepared by dispersing an organic solvent solution of the base resin (B) (and other binder resin added as desired) obtained according to the above method in water by a known method may be used. The dispersing method is not particularly restricted, and examples thereof include a method of emulsifying with a emulsifying agent; a method of dispersing by neutralizing a part of a carboxyl group possessed by the base resin (B) (and other binder resin added as desired) with a basic compound; and the like. In the case of an aqueous coating composition, one obtained by emulsion polymerization may be used as a metal-containing acrylic resin (acrylic resin (IV) and the like) having the cross-linking structure.

Examples of the basic compound include, but are not particularly restricted to, ammonia (aqueous solution); alkyl amines such as triethylamine, trimethylamine and butylamine; alcohol amines such as ethanol amine, 2-dimethylaminoethanol, triethanolamine, diethylethanolamine, dimethylethanolamine and aminomethylpropanol; and morpholine. Among these, ammonia (aqueous solution) and ethanolamine are preferred. These basic compounds may be used singly or in combination of two or more kinds.

[Additive]

The coating composition of the present invention may be added with commonly used additives such as an antifouling agent, a plasticizer, a pigment and a solvent.

The antifouling agent is not particularly restricted, and those well known in the art may be used, and examples thereof include inorganic compounds, organic compounds containing metal and organic compounds not containing metal.

Concrete examples of the antifouling agent include zinc oxide, cuprous oxide, manganese ethylenebis(dithiocarbamate), zinc dimethyldithiocarbamate, 2-methylthio-4-t-butylamino-6-cyclopropylamino-s-triazine, 2,4,5,6-tetrachloroisophthalonitrile, N,N-dimethyldichlorophenylurea, zinc ethylenebis(dithiocarbomate), copper thiocyanate, 4,5,-dichloro-2-n-octyl-3(2H)isothiazolone, N-(fluorodichloromethylthio)phthalimide, N,N'-dimethyl-N'-phenyl-(N-fluorodichloromethylthio)sulfamide, 2-pyridinethiol-1-oxide metal salts such as 2-pyridinethiol-1-oxide zinc salt and copper salt, tetramethylthiuram disulfide, 2,4,6-trichlorophenylmaleimide, 2,3,5,6-tetrachloro-4-(methylsulfonyl)pyridine, 3-iode-2-propylbutylcarbamate, diiodomethyl-p-tolylsulfone, phenyl(bispyridyl)bismuth dichloride, 2-(4-thiazolyl)-benzimidazole, triphenylboron pyridine salt, stearylamine-triphenylboron, laurylamine-triphenylboron and bis(dimethyldithiocarbamoyl) zinc ethylenebis(dithiocarbamate). These antifouling agents may be used singly or in combination of two or more kinds.

The content of the antifouling agent is preferably within a range between a lower limit of 0.1% by weight and an upper limit of 80% by weight in the solid content of the coating composition. When it is less than 0.1% by weight, the antifouling effect by the antifouling agent cannot be expected, whereas when it is more than 80% by weight, defects such as cracks and peeling can occur in the coating film. The content of the antifouling agent is more preferably in a range between a lower limit of 1% by weight and an upper limit of 60% by weight.

Examples of the plasticizer include phthalate ester plasticizers such as dioctyl phthalate, dimethyl phthalate and dicyclohexyl phthalate; aliphatic dibasic acid ester plasticizers such as isobutyl adipate and dibutyl sebacate; glycol ester plasticizers such as diethylene glycol dibenzoate and pentaerythritol alkyl ester; phosphate ester plasticizers such as trichlene diphosphate and trichloroethyl phosphate; epoxy plasticizers such as epoxidized soybean oil and octyl epoxystearate; organotin plasticizers such as dioctyltin laurate, and dibutyltin laurate; and trioctyl trimellitate, triacetylene and the like. These plasticizers may be used singly or in combination of two or more kinds.

Examples of the pigment include extender pigments such as precipitated barium, talc, clay, chalk, silica white, alumina white and bentonite; and color pigments such as titanium dioxide, zirconium oxide, basic lead sulfate, tin oxide, carbon black, graphite, red iron oxide, chrome yellow, phthalocyanine green, phthalocyanine blue and quinacridone. These pigments may be used singly or in combination of two or more kinds.

Examples of the solvent includes hydrocarbons such as toluene, xylene, ethylbenzene, cyclopentane, octane, heptane, cyclohexane and white spirit; ethers such as dioxane, tetrahydrofuran, ethylene glycol monomethyl ether, ethylene glycol monoethyl ether, ethylene glycol monobutyl ether, ethylene glycol dibutyl ether, diethylene glycol monomethyl ether, and diethylene glycol monoethyl ether; esters such as butyl acetate, propyl acetate, benzyl acetate, ethylene glycol monomethyl ether acetate and ethylene glycol monoethyl ether acetate; ketones such as ethyl isobutyl ketone and methyl isobutyl ketone; and alcohols such as n-butanol and propyl alcohol. These solvents may be used singly or in combination of two or more kinds.

Examples of the additives other than those mentioned above include monobasic organic acids such as monobutyl phthalate and monooctyl succinate, camphor, castor oil and the like; water binder, antisagging agents, antiflooding agents; antisetting agents; and antifoamers.

The coating composition of the present invention may for example be prepared by adding the organic polymer particle (A), and as desired, additives such as an antifouling agent, a plasticizer, a controlling agent for a coating film attrition, a pigment and a solvent, to the base resin (B) and the other binder resin added as desired, or to a resin composition containing these, and mixing them together by means of a mixer such as a ball mill, a pebble mill, a roll mil, a sand grinding mill or the like.

The coating composition of the present invention is superior to a conventional coating composition in that it can impart excellent low frictional performance even when it is applied on a marine vessel sailing at a speed of about 10 to 30 knots. By applying the coating composition of the present invention, it is possible to greatly reduce the friction resistance in water compared with a case where a conventional antifouling coating composition is applied. The coating composition of the present invention is able to greatly contribute to reduce navigation fuel consumption, in particular, as a coating composition for vessel bottom.

The coating film of the present invention is formed from the coating composition of the present invention, and concretely, it may be formed by applying the coating composition of the present invention on the surface of an object to be coated by a routine method, and removing the solvent by vaporizing under normal temperature or heating. A method of applying the coating composition is not particularly restricted, and examples thereof include conventionally known methods such as dipping, spraying, brushing, roller application, electrostatic coating and electrodeposition. The object to be coated is not particularly restricted, and preferred are underwater structures such as marine vessels, piping materials and fishnets because they exhibit excellent low frictional performance. The coating surface of the object to be coated may be pre-treated as desired.

The coating film of the present invention is excellent in low frictional performance because it is formed from the coating composition of the present invention. The coating film of the present invention is able to retain excellent low frictional performance for a long term. Furthermore, the coating film of the present invention is also excellent in antifouling performance and anti-cracking performance.

In the following, the present invention will be described more specifically by way of examples and comparative examples, however, the present invention will not be restricted to these examples.

Preparation of Base Resin Solution

Production Example 1

Preparation of Resin Solution A

A 4-necked flask equipped with a condenser, a thermometer, a stirrer, a nitrogen gas introducing tube, and a decanter was charged with 20 g of isopropyl alcohol, 110 g of propylene glycol methyl ether and 22 g of zinc oxide, and heated to 80° C. 22 g of methacrylic acid and 75 g of naphthenic acid (MW=300, AV (acid value)=165) were added dropwise over two hours, and kept at this temperature for two hours. Then, the solvent in the solution was removed at 75° C. under reduced pressure, to obtain a monomer solution in which the concentration of a polymerizable monomer having a group represented by general formula (1) was 50.4% by weight.

Then, a 4-necked flask equipped with a condenser, a thermometer, a stirrer, and a nitrogen gas introducing tube was charged with 90 g of xylene, and heated to 100° C. Then, the resultant solution was added dropwise with a mixed solution of 30 g of methyl methacrylate, 55 g of tri-isopropylsilyl methacrylate, 5 g of 2-methoxyethyl methacrylate, 20 g of the monomer solution, and 1.5 g of t-butylperoxy 2-ethylhexanoate over three hours, and then kept at this temperature for three hours, to obtain a resin solution A having a solid content of 50.5% by weight. The resin solution A contains, as a base resin, an acrylic resin having the group represented by the general formula (1) and a group represented by the general formula (2) in side chains.

Production Example 2

Preparation of Resin Solution B

A 4-necked flask equipped with a condenser, a thermometer, a stirrer, and a nitrogen gas introducing tube was charged with 80 g of xylene and 20 g of n-butanol, and heated to 100° C. The solution was added dropwise with a mixed solution of 40 g of ethyl acrylate, 18 g (0.25M) of acrylic acid, 15 g of cyclohexyl acrylate, 27 g of methoxy polyethylene glycol methacrylate (n=9) and 1.5 g of t-butylperoxy 2-ethylhexanoate over three hours, and then kept at this temperature for three hours, to obtain a resin solution a.

Then, a 4-necked flask equipped with a condenser, a thermometer, a stirrer, a nitrogen gas introducing tube, and a decanter was charged with 200 g of the resin solution a, 80 g of rosin, 32 g of copper acetate, and 200 g of xylene, and the solvent was removed under reflux while xylene is added. Thereafter, 40 g of n-butanol was added, to obtain a resin solution B having a solid content of 51.3% by weight. The resin solution B contains, as a base resin, an acrylic resin having the group represented by the general formula (1) in a side chain.

Production Example 3

Preparation of Resin Solution C

A 4-necked flask equipped with a condenser, a thermometer, a stirrer, and a nitrogen gas introducing tube was charged with 100 g of xylene, and heated to 100° C. The resultant solution was added dropwise with a mixed solution of 40 g of methyl methacrylate, 55 g of tri-i-propylsilyl methacrylate, 5 g of 2-methoxyethyl methacrylate and 1.5 g of t-butylperoxy 2-ethylhexanoate over three hours, and then kept at this temperature for three hours, to obtain a resin solution C having a solid content of 50.7% by weight. The resin solution C contains, as a base resin, an acrylic resin having the group represented by the general formula (2) in a side chain.

Production Example 4

Preparation of Resin Solution D

A 4-necked flask equipped with a condenser, a thermometer, a stirrer, and a nitrogen gas introducing tube was added with 50 g of xylene and 40 g of n-butanol, and heated to 100° C. The resultant solution was added dropwise with a mixed solution of 20 g of methyl methacrylate, 40 g of ethyl acrylate, 15 g of zinc diacrylate, 25 g of zinc naphthenate acrylate and 1.2 g of t-butylperoxy 2-ethyl hexanoate over four hours. After 30 minutes from the termination of the dropwise addition, 0.3 g of t-butylperoxy 2-ethylhexanoate and 10 g of xylene were added dropwise over 30 minutes, and then kept at this temperature for two hours, to obtain a resin solution D having a solid content of 50.4% by weight. The resin solution D contains, as a base resin, an acrylic resin having a cross-linking structure containing Zn.

Production Example 5

Preparation of Resin Solution E

A 4-necked flask equipped with a condenser, a thermometer, a stirrer, a nitrogen gas introducing tube, and a decanter was charged with 20 g of isopropyl alcohol, 110 g of propylene glycol methyl ether and 21.5 g (0.25M) of copper oxide, and heated to 80° C. 22 g (0.25M) of methacrylic acid and 75 g of naphthenic acid (MW=300, AV (acid value)=165) were added dropwise over two hours, and kept at this temperature for two hours. Then, the solvent in the resultant solution was removed at 75° C. under reduced pressure, to obtain a monomer solution in which the concentration of a polymerizable monomer having the group represented by the general formula (1) was 50.4% by weight.

Then, a 4-necked flask equipped with a condenser, a thermometer, a stirrer, and a nitrogen gas introducing tube was charged with 90 g of xylene and heated to 100° C. The resultant solution was added dropwise with a mixed solution of 30 g of methyl methacrylate, 55 g of tri-i-propylsilyl methacrylate, 5 g of 2-methoxyethyl methacrylate, 20 g of the monomer solution and 1.5 g of t-butylperoxy 2-ethylhexanoate over three hours, and then kept at this temperature for three hours, to obtain a resin solution E having a solid content of 50.5% by weight. The resin solution E contains, as a base resin, an acrylic resin having the group represented by the general formula (1) and the group represented by the general formula (2) in side chains.

Production Example 6

Preparation of Resin Solution F

A 4-necked flask equipped with a condenser, a thermometer, a stirrer, and a nitrogen gas introducing tube was charged with 50 g of xylene and 40 g of n-butanol, and heated to 100° C. The solution was then added dropwise with a mixed solution of 20 g of methyl methacrylate, 40 g of ethyl acrylate, and 25 g of zinc diacrylate, 15 g of isobutyl acrylate, and 1.2 g of t-butylperoxy 2-ethylhexanoate over four hours. After 30 minutes from the termination of the dropwise addition, 0.3 g of t-butylperoxy 2-ethylhexanoate and 10 g of xylene were added dropwise over 30 minutes, and then kept at this temperature for two hours, to obtain a resin solution F having a solid content of 50.3% by weight. The resin solution F contains, as a base resin, an acrylic resin having a cross-linking structure containing Zn.

Production Example 7

Preparation of Resin Solution G

A 4-necked flask equipped with a condenser, a thermometer, a stirrer, and a nitrogen gas introducing tube was charged with 90 g of xylene and heated to 100° C. The resultant solution was added dropwise with a mixed solution of 10 g of methyl methacrylate, 32 g of ethyl acrylate, 40 g of tri-i-propylsilyl methacrylate, 18 g of acrylic acid and 1.2 g of t-butylperoxy 2-ethylhexanoate over two hours. After 30 minutes from the termination of the dropwise addition, 0.3 g of t-butylperoxy 2-ethylhexanoate and 10 g of xylene were added dropwise over 30 minutes, and then kept at this temperature for three hours. The resultant solution was added with 80 g of rosin, 29.7 g of copper acetate and 200 g of xylene, and allowed to react for eight hours while the generating acetic acid was removed. Thereafter, xylene was added, to obtain a resin solution G having a solid content of 52% by weight. The resin solution G contains, as a base resin, an acrylic resin having the group represented by the general formula (1) and the group represented by general formula (2) in side chains.

Production Example 8

Preparation of Resin Solution H 200 g of the resin solution a obtained in Production Example 2 was added with 70 g of naphthenic acid (AV (acid value)=200), 38 g of copper acetate, 200 g of xylene, and allowed to react for eight hours while the generating acetic acid was removed. Thereafter, xylene was added, to obtain a resin solution H having a solid content of 51% by weight. The resin solution H contains, as a base resin, an acrylic resin having the group represented by the general formula (1) in a side chain.

Production Example 9

Preparation of Resin Solution I 200 g of the resin solution a obtained in Production Example 2 was added with 85 g of naphthenic acid (AV (acid value)=165), 34 g of zinc acetate and 200 g of xylene, and allowed to react for eight hours while the generating acetic acid was removed. Thereafter, xylene was added, to obtain a resin solution I having a solid content of 55% by weight. The resin solution I contains, as a base resin, an acrylic resin having the group represented by the general formula (1) in a side chain.

Preparation of an Organic Polymer Particle

Production Examples 10 to 19

Chitin (available from Dainichiseika Color & Chemicals Mfg. Co., Ltd) was crushed by a jet crusher, to obtain organic polymer particles of chitin having a weight average particle size of 1, 5, 10, 20, 35 and 50 μm, respectively (hereinafter, referred to as organic polymer particles I to VI, respectively). Likewise, chitosan (available from Dainichiseika Color & Chemicals Mfg. Co., Ltd) was crushed by a jet crusher, to obtain organic polymer particles of chitosan having a weight average particle size of 5, 15, 30 and 60 μm, respectively (hereinafter, referred to as organic polymer particles VII to X, respectively). The weight average particle size of the organic polymer particles was measured by using "Laser diffraction-type particle size distribution measuring apparatus SALD-2200" manufactured by Shimadzu Corporation (dispersion medium: ethanol, measuring temperature: 25° C.).

Production Example 20

An aqueous solution consisting of 70 g of ER-20 (nonionic emulsifying agent available from ADEKA Corporation), 20 g of polyvinyl allylamine (number average molecular weight 25000) and 300 g of ion exchanged water was added with a solution consisting of 50 g of methyl methacrylate, 10 g of methacrylic acid, 75 g of 2-ethylhexyl methacrylate, 20 g of cylohexyl acrylate, 7 g of ethyleneglycol dimethacryrylate and 8 g of potassium persulfate, and then allowed to emulsify using a stirrer, to obtain a suspension A.

Next, a reaction container equipped with a dropping funnel, a thermometer, a nitrogen gas introducing tube, a condenser, and a stirrer was charged with 3 g of ER-20 (nonionic emulsifying agent available from ADEKA Corporation), 5 g of acetic acid salt of polyvinyl allylamine (number average molecular weight 25000), and 270 g of ion exchanged water and the temperature was raised to 70° C. Then, the resultant mixture liquid was added with 300 g of the suspension A through the dropping funnel over 90 minutes, and allowed to react for five hours at 70° C. The obtained reaction liquid was lyophilized to obtain 115 g of an organic polymer particle XI. The weight average particle size of the organic polymer particle XI by the measurement method described above was 1.8 μm.

Production Example 21

An aqueous solution consisting of 60 g of ER-20 (nonionic emulsifying agent available from ADEKA Corporation) and 300 g of ion exchanged water was added with a solution consisting of 50 g of methyl methacrylate, 75 g of 2-ethylhexyl methacrylate, 20 g of cyclohexyl acrylate, 20 g of ethyleneglycol dimethacryrylate and 8 g of azobis isobutyronitrile, and then allowed to emulsify using a stirrer, to obtain a suspension B (particle size 15 μm).

Then, a reaction container equipped with a dropping funnel, a thermometer, a nitrogen gas introducing tube, a condenser, and a stirrer was charged with 0.5 g of hydroquinone, 5 g of ER-20 (nonionic emulsifying agent available from ADEKA Corporation), and 270 g of ion exchanged water, and the temperature was raised to 70° C. Then, the resultant mixture liquid was added with 300 g of the suspension B through the dropping funnel over 30 minutes, and allowed to react for five hours at 70° C. The obtained reaction liquid was lyophilized, to obtain 122 g of an organic polymer particle XII. The weight average particle size of the organic polymer particle XII by the measurement method described above was 18 µM.

Production Example 22

An aqueous solution consisting of 40 g of ER-20 (nonionic emulsifying agent available from ADEKA Corporation), 20 g of polyvinyl allylamine (number average molecular weight 25000) and 300 g of ion exchanged water was added with a solution consisting of 50 g of methyl methacrylate, 70 g of 2-ethylhexyl methacrylate, 5 g of 2-hydroxyethyl methacrylate, 20 g of cyclohexyl acrylate, 20 g of ethyleneglycol dimethacyrylate and 8 g of azobis isobutyronitrile, and allowed to emulsify using a stirrer, to obtain a suspension C (particle size 18 µm).

Then, a reaction container equipped with a dropping funnel, a thermometer, a nitrogen gas introducing tube, a condenser, and a stirrer was charged with 0.5 g of hydroquinone, 3 g of ER-20 (nonionic emulsifying agent available from ADEKA Corporation), 5 g of acetic acid salt of polyvinyl allylamine (number average molecular weight 25000), and 270 g of ion exchanged water, and the temperature was raised to 70° C. Then, the resultant mixture liquid was added with 300 g of the suspension C through the dropping funnel over 30 minutes, and allowed to react for 5 hours at 70° C. The obtained reaction liquid was lyophilized, to obtain 122 g of an organic polymer particle XIII. The weight average particle size of the organic polymer particle XIII by the measurement method described above was 22 µm.

Examples 1 to 16, Comparative Examples 1 to 11

According to the blending compositions shown in Table 1 and Table 2, respective blending components were dispersed with glass beads using a disper, and coating compositions were prepared. The unit of values of blending amounts in Table 1 and Table 2 is "gram (g)" for all. Antifouling agents a to h used herein are as follows. For the obtained coating compositions, the following evaluation was conducted.
Antifouling agent a: zinc dimethyldithiocarbamate
Antifouling agent b: N-(fluorodichloromethylthio)phthalimide
Antifouling agent c: 3-iodo-2-propenylbutylcarbamate
Antifouling agent d: pyridine-triphenylborane
Antifouling agent e: copper thiocyanate
Antifouling agent f: cuprous oxide
Antifouling agent g: zinc pyrithione
Antifouling agent h: copper pyrithione
(Friction Resistance Test)
The obtained coating composition was applied on a cylindrical drum made of polyvinyl chloride having a diameter of 10 cm and a height of 10 cm, and dried to form a coating film, and then the drum was rotated in sea water (about 10 knots in terms of circumferential speed), and friction resistance was measured by a torque meter. Measurement was conducted while taking the friction resistance of a flat and smooth cylindrical drum made of polyvinyl chloride that is mirror-finished by buffing as a standard, and increase or decrease in the friction resistance of each case is shown in Table 1 and Table 2. The friction resistances of immediately after immersing in sea water (initial stage), and after immersing in seawater for one month were evaluated. The "friction resistance coefficient" shown in Table 1 and Table 2 is a value calculated by the following equation:

"Friction resistance coefficient"=[(friction resistance when each coating composition is applied)−(standard friction resistance)]/(standard friction resistance)×100(%)

The energy consumption unit in the navigation of marine vessels (this means energy consumption per a unit production value, and the larger the energy consumption unit, the poor a so-called fuel consumption is) is in proportion to navigation resistance. Therefore, it is possible to reduce the energy consumption unit in correspondence with the decreasing rate of the friction resistance coefficient.
(Antifouling Performance Test)
To an acryl plate of 10 cm×30 cm in size, the obtained coating composition was applied so that the dry film thickness was about 200 µm, and dried at room temperature for two days and nights, to obtain a test coating film plate. Then, an immersing test was executed for 12 months with a raft at Marine Research Laboratory (Tamano, Okayama, Japan), Nippon Paint Marine Coatings Co., Ltd. The adhesion of organisms to the test coating film plate after execution of the test was evaluated by visual observation. Evaluation results are shown in Table 1 and Table 2.
A; Adhesion of large organisms such as barnacles, mussels and algae is not observed.
B; Adhesion of large organisms such as barnacles, mussels and algae is observed.
(Anti-Cracking Performance Test)
To an acryl plate of 10 cm×30 cm in size, the obtained coating composition was applied so that the dry film thickness was about 200 µm, and dried at room temperature for two days and nights, to obtain a test coating film plate. Then, an immersing was conducted for a week with a raft at Marine Research Laboratory (Tamano, Okayama, Japan), Nippon Paint Marine Coatings Co., Ltd., and dried for three days. This immersing and drying were repeated five times, and then presence/absence of the cracking of the coating film was evaluated by visual observation. Evaluation results are shown in Table 1 and Table 2.
A; No cracks observed.
B; Cracks observed.

TABLE 1

| | Particle size | Comparative Example 1 | Comparative Example 2 | Example 1 | Example 2 | Example 3 | Comparative Example 3 | Comparative Example 4 |
|---|---|---|---|---|---|---|---|---|
| Resin solution A | | 50 | 50 | 50 | 50 | 50 | 50 | 50 |
| Zinc oxide | | 5 | 5 | 5 | 5 | 5 | 5 | 6.9 |
| Titanium oxide | | 5 | 5 | 5 | 5 | 5 | 5 | 5 |
| Phthalocyanine blue | | 3 | 3 | 3 | 3 | 3 | 3 | 3 |
| Organic polymer particle I | 1 µm | 2 | | | | | | |
| Organic polymer particle II | 5 µm | | 2 | | | | | |
| Organic polymer particle III | 10 µm | | | 2 | | | | 0.1 |
| Organic polymer particle IV | 20 µm | | | | | 2 | | |

TABLE 1-continued

| | | | | | | | | |
|---|---|---|---|---|---|---|---|---|
| Organic polymer particle V | 35 μm | | | | | | 2 | |
| Organic polymer particle VI | 50 μm | | | | | 2 | | |
| Antifouling agent a | | 4 | 4 | 4 | 4 | 4 | 4 | 4 |
| Antifouling agent b | | 4 | 4 | 4 | 4 | 4 | 4 | 4 |
| Antifouling agent c | | 3 | 3 | 3 | 3 | 3 | 3 | 3 |
| Antifouling agent d | | 4 | 4 | 4 | 4 | 4 | 4 | 4 |
| Antifouling agent g | | 4 | 4 | 4 | 4 | 4 | 4 | 4 |
| Chlorinated paraffin | | 3 | 3 | 3 | 3 | 3 | 3 | 3 |
| Dibutyl phthalate | | 2 | 2 | 2 | 2 | 2 | 2 | 2 |
| Colloidal silica | | 3 | 3 | 3 | 3 | 3 | 3 | 3 |
| n-butanol | | 2 | 2 | 2 | 2 | 2 | 2 | 2 |
| Xylene | | 6 | 6 | 6 | 6 | 6 | 6 | 6 |
| Total | | 100 | 100 | 100 | 100 | 100 | 100 | 100 |
| Particle/Solid content (% by weight) [1] | | 3.0 | 3.0 | 3.0 | 3.0 | 3.0 | 3.0 | 0.1 |
| Solid content (% by weight) [2] | | 67 | 67 | 67 | 67 | 67 | 67 | 67 |
| Friction resistance coefficient | Initial | −1.2% | −1.4% | −2.8% | −3.2% | −3.2% | 0.1% | −0.3% |
| | After immersing for one month | −2.4% | −2.2% | −5.6% | −7.8% | −6.5% | −0.2% | −0.8% |
| Antifouling test | | A | A | A | A | A | A | A |
| Anti-cracking test | | A | A | A | A | A | A | A |

| | Comparative Example 5 | Example 4 | Example 5 | Example 6 | Example 7 | Comparative Example 6 | Comparative Example 7 |
|---|---|---|---|---|---|---|---|
| Resin solution A | 50 | 50 | 50 | 50 | 50 | 50 | 50 |
| Zinc oxide | 6.7 | 6.65 | 6 | 4 | 3.65 | 2.5 | 7 |
| Titanium oxide | 5 | 5 | 5 | 5 | 5 | 5 | 5 |
| Phthalocyanine blue | 3 | 3 | 3 | 3 | 3 | 3 | 3 |
| Organic polymer particle I | | | | | | | |
| Organic polymer particle II | | | | | | | |
| Organic polymer particle III | 0.3 | 0.35 | 1 | 3 | 3.35 | 4.5 | |
| Organic polymer particle IV | | | | | | | |
| Organic polymer particle V | | | | | | | |
| Organic polymer particle VI | | | | | | | |
| Antifouling agent a | 4 | 4 | 4 | 4 | 4 | 4 | 4 |
| Antifouling agent b | 4 | 4 | 4 | 4 | 4 | 4 | 4 |
| Antifouling agent c | 3 | 3 | 3 | 3 | 3 | 3 | 3 |
| Antifouling agent d | 4 | 4 | 4 | 4 | 4 | 4 | 4 |
| Antifouling agent g | 4 | 4 | 4 | 4 | 4 | 4 | 4 |
| Chlorinated paraffin | 3 | 3 | 3 | 3 | 3 | 3 | 3 |
| Dibutyl phthalate | 2 | 2 | 2 | 2 | 2 | 2 | 2 |
| Colloidal silica | 3 | 3 | 3 | 3 | 3 | 3 | 3 |
| n-butanol | 2 | 2 | 2 | 2 | 2 | 2 | 2 |
| Xylene | 6 | 6 | 6 | 6 | 6 | 6 | 6 |
| Total | 100 | 100 | 100 | 100 | 100 | 100 | 100 |
| Particle/Solid content (% by weight) [1] | 0.4 | 0.5 | 1.5 | 4.5 | 5.0 | 6.7 | 0.0 |
| Solid content (% by weight) [2] | 67 | 67 | 67 | 67 | 67 | 67 | 67 |
| Friction resistance coefficient | −0.6% | −0.7% | −1.4% | −2.8% | −3.0% | −1.2% | 0.5% |
| | −0.8% | −4.4% | −5.2% | −5.6% | −6.3% | −2.1% | 0.8% |
| Antifouling test | A | A | A | A | A | A | A |
| Anti-cracking test | A | A | A | A | A | A | A |

[1] "Particle/solid content" means the content of an organic polymer particle in the solid content of the coating composition.
[2] "Solid content" means the solid content of the coating composition.

TABLE 2

| | Particle size | Comparative Example 8 | Example 8 | Example 9 | Example 10 | Example 11 | Comparative Example 9 | Comparative Example 10 |
|---|---|---|---|---|---|---|---|---|
| Resin solution B | | 50 | 50 | | | | | |
| Resin solution C | | | | 45 | | | | |
| Resin solution D | | | | | 40 | | | |
| Resin solution E | | | | | | 55 | | 50 |
| Resin solution F | | | | | | | | |
| Resin solution G | | | | | | | | |
| Resin solution H | | | | | | | | |
| Resin solution I | | | | | | | 50 | |
| Zinc oxide | | 5 | 5 | 20 | 15 | | 20 | |
| Titanium oxide | | 5 | 5 | 5 | 2 | | | |
| Phthalocyanine blue | | | | 3 | 5 | | 2 | |
| Organic polymer particle II | 5 μm | 2 | | | | | | |
| Organic polymer particle III | 10 μm | | 3 | | | | | |
| Organic polymer particle IV | 20 μm | | | 3 | 2 | | | |

TABLE 2-continued

| | | | | | | | | |
|---|---|---|---|---|---|---|---|---|
| Organic polymer particle V | 35 μm | | | | 2 | | | |
| Organic polymer particle VI | 50 μm | | | | | | 2 | |
| Organic polymer particle VII | 5 μm | | | | | | | 3 |
| Organic polymer particle VIII | 15 μm | | | | | | | |
| Organic polymer particle IX | 30 μm | | | | | | | |
| Organic polymer particle X | 60 μm | | | | | | | |
| Antifouling agent d | | | | 6 | 6 | | 5 | |
| Antifouling agent e | | | | | 5 | | | |
| Antifouling agent f | | 15 | 20 | | | 20 | | 20 |
| Antifouling agent g | | 6 | | 4 | 3 | | 5 | |
| Antifouling agent h | | | 4 | | | 5 | | 6 |
| Chlorinated paraffin | | | 3 | 3 | | 5 | 4 | |
| Dibutyl phthalate | | 2 | | | | | | |
| Colloidal silica | | 3 | 3 | 2 | 4 | 2 | 2 | 3 |
| n-butanol | | 2 | 2 | 3 | 3 | | 2 | |
| Xylene | | 6 | 3 | 6 | | 8 | | |
| 5R8000 [3] | | | 2 | | | | | |
| Polyvinylethylether | | 4 | | | 5 | | | 6 |
| Rosin | | | | | 4 | | | 5 |
| Methylisobutyl ketone | | | | | 6 | 3 | 8 | 7 |
| Total | | 100 | 100 | 100 | 100 | 100 | 100 | 100 |
| Particle/Solid content (% by weight) [1] | | 3.0 | 4.2 | 4.4 | 3.2 | 3.2 | 3.0 | 4.4 |
| Solid content (% by weight) [2] | | 67.7 | 70.7 | 68.8 | 62.2 | 62.1 | 67.5 | 68.7 |
| Friction Resistance coefficient | Initial | 0.2% | −0.8% | −1.2% | −1.5% | −0.6% | 0.3% | −0.8% |
| | After immersing for one month | −0.3% | −6.8% | −8.7% | −6.3% | −5.9% | −0.8% | −2.2% |
| Antifouling test | | A | A | A | A | A | A | A |
| Anti-cracking test | | A | A | A | A | A | A | A |

| | Example 12 | Example 13 | Comparative Example 11 | Example 14 | Example 15 | Example 16 |
|---|---|---|---|---|---|---|
| Resin solution B | | | | | 50 | 50 |
| Resin solution C | | | | | | |
| Resin solution D | | | | | | |
| Resin solution E | 55 | | | | | |
| Resin solution F | | 40 | | | | |
| Resin solution G | | | 50 | | | 55 |
| Resin solution H | | | | 45 | | |
| Resin solution I | | | | | 55 | |
| Zinc oxide | | 20 | | 5 | 20 | |
| Titanium oxide | | | | 3 | 3 | |
| Phthalocyanine blue | | 5 | | | 5 | |
| Organic polymer particle II | | | | | | |
| Organic polymer particle III | | | | | 3 | |
| Organic polymer particle IV | | | | | | 3 |
| Organic polymer particle V | | | | 2 | | |
| Organic polymer particle VI | | | | | | |
| Organic polymer particle VII | | | | | | |
| Organic polymer particle VIII | 3 | | | | | |
| Organic polymer particle IX | | 3 | | | | 0.2 |
| Organic polymer particle X | | | 3 | | | |
| Antifouling agent d | | 7 | | | | |
| Antifouling agent e | | | | | | |
| Antifouling agent f | 23 | | 20 | 15 | | 17 |
| Antifouling agent g | | 7 | | 4 | 8 | |
| Antifouling agent h | 6 | | 7 | 6 | 6 | 7 |
| Chlorinated paraffin | | 5 | 3 | | | |
| Dibutyl phthalate | | | | | | |
| Colloidal silica | 2 | 2 | 2 | 3 | | 3 |
| n-butanol | | | | | | |
| Xylene | | 3 | 5 | 3 | | |
| 5R8000 [3] | | | 2 | 2 | | 2 |
| Polyvinylethylether | 5 | | | 4 | | 6 |
| Rosin | 6 | | 8 | 8 | | 6 |
| Methylisobutyl ketone | | 8 | | | | 0.8 |
| Total | 100 | 100 | 100 | 100 | 100 | 100 |
| Particle/Solid content (% by weight) [1] | 4.5 | 4.5 | 4.2 | 2.7 | 4.0 | 4.4 |
| Solid content (% by weight) [2] | 67.1 | 67.1 | 71.0 | 75.0 | 75.3 | 72.8 |

TABLE 2-continued

| | | | | | | |
|---|---|---|---|---|---|---|
| Friction Resistance coefficient | −1.1% | −0.3% | 1.2% | −1.3% | −0.7% | −0.5% |
| | −7.2% | −6.1% | 0.6% | −8.0% | −4.2% | −6.5% |
| Antifouling test | A | A | A | A | A | A |
| Anti-cracking test | A | A | A | A | A | A |

[1] "Particle/solid content" means the content of an organic polymer particle in the solid content of the coating composition.
[2] "Solid content" means the solid content of the coating composition.
[3] "5R8000" is red iron oxide available from Fuji Pigment Co., Ltd.

From the result of friction resistance test shown in Table 1, the following points are revealed.

(A) Comparing Comparative Example 2 in which the organic polymer particle II having a weight average particle size of 5 μm is blended, with Example 1 in which the organic polymer particle III having a weight average particle size of 10 μm is blended, in Example 1, the friction resistance coefficients at the initial stage and after immersing in seawater for one month are smaller by twice or more, and low frictional performance dramatically increases with these particle sizes being the borderline.

(B) Comparing Example 3 in which the organic polymer particle V having a weight average particle size of 35 μm is blended, with Comparative Example 3 in which the organic polymer particle VI having a weight average particle size of 50 μm is blended, in Example 3, the friction resistance coefficients at the initial stage and after immersing in seawater for one month are smaller by thirty times or more, and low frictional performance dramatically increases with these particle sizes being the borderline.

(C) On the other hand, in Comparative Examples 1 and 2 in which the organic polymer particles I and II having a weight average particle size of 1 and 5 μm are blended respectively, the friction resistance coefficient is slightly reduced compared to Comparative Example 7 not blending an organic polymer particle, however the reduction is not as significant as that in the case of a weight average particle size of 10 to 35 μm. Comparing Comparative Example 1 and Comparative Example 2, there is no substantial difference between respective friction resistance coefficients.

From these results, it is revealed that a coating film exhibiting very excellent low frictional performance is obtained by blending the organic polymer particle having a weight average particle size of 10 to 35 μm. Also Table 2 shows a similar result.

From the result of the friction resistance test shown in Table 1, the following are also revealed.

(D) Comparing Comparative Example 5 in which the content of an organic polymer particle in the solid content of the coating composition is 0.4% by weight, with Example 4 in which the content of an organic polymer particle is 0.5% by weight, in Example 4, the friction resistance coefficient, in particular, after immersing in seawater for one month is smaller by five times or more, and the low frictional performance after immersing in seawater for one month is significantly improved with these contents being the borderline.

(E) Comparing Example 7 in which the content of an organic polymer particle in the solid content of the coating composition is 5.0% by weight, with Comparative Example 6 in which the content of an organic polymer particle is 6.7% by weight, in Example 7, the friction resistance coefficient, in particular, after immersing in seawater for one month is smaller by three times, and low frictional performance after immersing in seawater for one month is significantly improved with these contents being the borderline.

From these results, it is revealed that excellent low frictional performance is obtained for a longer term by setting the content of an organic polymer particle in the solid content of the coating composition at about 0.5 to 5.0% by weight.

Examples 17 to 18, Comparative Examples 12 to 14

According to the blending compositions shown in Table 3, respective blending components were dispersed with glass beads using a disper, and coating compositions were prepared. The unit of values of blending amounts in Table 3 is "gram (g)" for all. The antifouling agents d to h used herein are as described above. For the obtained coating compositions, evaluation was conducted in a similar manner as in Examples 1 to 16 and Comparative Examples 1 to 11. Evaluation results are shown in Table 3.

TABLE 3

| | Particle size | Example 17 | Example 18 | Comparative Example 12 | Comparative Example 13 | Comparative Example 14 |
|---|---|---|---|---|---|---|
| Resin solution A | | | | | 52 | 50 |
| Resin solution B | | 52 | | 52 | | |
| Resin solution G | | | 55 | | | |
| Zinc oxide | | 10 | | 10 | 10 | 7.5 |
| Titanium oxide | | 5 | | 5 | 5 | 5 |
| Phthalocyanine blue | | 3 | | 3 | 3 | 3 |
| Organic polymer particle XI | 1.8 μm | | | 2 | | |
| Organic polymer particle XII | 18 μm | | | | 2 | |
| Organic polymer particle XIII | 22 μm | 2 | 3.2 | | | 4.5 |
| Antifouling agent d | | 4 | | 4 | 4 | 4 |
| Antifouling agent e | | 5 | | 5 | 5 | 5 |
| Antifouling agent f | | | 19 | | | |
| Antifouling agent g | | 5 | | 5 | 5 | 5 |
| Antifouling agent h | | | 7 | | | |

TABLE 3-continued

| | Particle size | Example 17 | Example 18 | Comparative Example 12 | Comparative Example 13 | Comparative Example 14 |
|---|---|---|---|---|---|---|
| Chlorinated paraffin | | 3 | 6 | 3 | 3 | 5 |
| Colloidal silica | | 3 | 3 | 3 | 3 | 3 |
| Xylene | | 8 | 0.8 | 8 | 8 | 8 |
| Rosin | | | 6 | | | |
| Total | | 100 | 100 | 100 | 100 | 100 |
| Particle/Solid content (% by weight) [1] | | 3.0 | 4.4 | 3.0 | 3.0 | 6.7 |
| Solid content (% by weight) [2] | | 67.0 | 72.8 | 67.0 | 67.0 | 67.0 |
| Friction Resistance coefficient | Initial | −1.8% | −0.8% | −0.2% | 0.1% | −0.4% |
| | After immersing for one month | −4.6% | −5.9% | −0.6% | −0.2% | −1.2% |
| Antifouling test | | A | A | A | A | A |
| Anti-cracking test | | A | A | A | A | A |

[1] "Particle/solid content" means the content of an organic polymer particle in the solid content of the coating composition.
[2] "Solid content" means the solid content of the coating composition.

Table 3 reveals that even when an organic polymer particle composed of synthetic resin particles is used, the low frictional performance of in particular after immersing in seawater for one month is significantly improved when they have a hydroxyl group and a cationic group, and the weight average particle size and content of the organic polymer particle fall within predetermined ranges of the present invention (Examples 17 and 18). On the other hand, it is revealed that a significant friction resistance reducing effect is not observed when the weight average particle size does not fall within the predetermined range of the present invention (Comparative example 12), when the organic polymer particle does not have predetermined substituents (Comparative examples 12 and 13) or when the content of the organic polymer particle does not fall within the predetermined range of the present invention (Comparative example 14).

Although the present invention has been described and illustrated in detail, it is clearly understood that the same is by way of illustration and example only and is not to be taken by way of limitation, the scope of the present invention being interpreted by the terms of the appended claims.

What is claimed is:

1. A coating composition comprising:
an organic polymer particle (A) composed of an organic polymer having a hydroxyl group and a cationic group in a molecule, said organic polymer particle (A) having a weight average particle size of 10 to 35 μm, as measured by using a laser diffraction-type particle size distribution measuring apparatus, and
a base resin (B) having at least any one of a group represented by the following general formula (1):

—COO-M-OCO-A     (1)

(wherein, M represents a divalent or higher valent metal, and A represents an organic acid residue of monobasic acid) and a group represented by the following general formula (2):

—COO—Si($R^1R^2R^3$)     (2)

(wherein, $R^1$, $R^2$ and $R^3$, which may be the same or different from one another, represent an isopropyl group or an n-butyl group) in a side chain, or having a cross-linking structure cross-linking between main chains, represented by the following general formula (3):

—COO-M-OCO     (3)

(wherein, M represents the same meaning as described above), wherein the content of said organic polymer particle (A) is 0.5 to 5.0% by weight in the solid content of the coating composition.

2. The coating composition according to claim 1, wherein said cationic group is an amino group or an amide group.

3. The coating composition according to claim 2, wherein said organic polymer is at least one kind selected from the group consisting of chitin, chitosan and derivatives thereof.

4. The coating composition according to claim 1, wherein said base resin (B) contains an acrylic resin having the group represented by said general formula (1) in a side chain.

5. The coating composition according to claim 1, wherein said base resin (B) contains a resin having at least any one of the group represented by said general formula (1) and the group represented by said general formula (2) in a side chain, and having a cross-linking structure represented by said general formula (3) that cross-links between main chains.

6. A method of producing a coating composition comprising the step of: mixing an organic polymer particle (A) composed of an organic polymer having a hydroxyl group and a cationic group in a molecule, said organic polymer particle (A) having a weight average particle size of 10 to 35 μm, as measured by using a laser diffraction-type particle size distribution measuring apparatus; and
a base resin (B) having at least any one of a group represented by the following general formula (1):

—COO-M-OCO-A     (1)

(wherein, M represents a divalent or higher valent metal, and A represents an organic acid residue of monobasic acid) and a group represented by the following general formula (2):

—COO—Si($R^1R^2R^3$)     (2)

(wherein, $R^1$, $R^2$ and $R^3$, which may be the same or different from one another, represent an isopropyl group or an n-butyl group) in a side chain, or having a cross-linking structure cross-linking between main chains, represented by the following general formula (3):

—COO-M-OCO     (3)

(wherein, M represents the same meaning as described above) so that the content of said organic polymer particle (A) is 0.5 to 5.0% by weight in the solid content of the coating composition.

7. A coating film formed from the coating composition according to claim 1.

8. An underwater structure having a coating film formed from the coating composition according to claim 1.

9. A marine vessel having a coating film formed from the coating composition according to claim 1.

* * * * *